United States Patent Office 3,280,200
Patented Oct. 18, 1966

3,280,200
PROCESS FOR PREPARING ORTHO- AND PARA-NITROMETHYL PHENYL CARBINOLS
Albert H. Greer, Haddonfield, N.J., assignor to Pfaudler Permutit Inc., Birmingham, N.J., a corporation of New York
No Drawing. Filed Sept. 17, 1962, Ser. No. 224,238
3 Claims. (Cl. 260—618)

This invention relates to a process for the production of p-nitroacetophenone.

p-Nitroacetophenone is an important starting material for the commercial preparation of the synthetic antibiotic product chloramphenicol, and methods are known in the art for its preparation. However, many of the known processes are not advantageous because of low yield, the required separation of hazardous intermediates, the employment of expensive methods of maintaining low operating temperatures, the use of extremely refined distillation and separation methods, the use of large quantities of intermediate reactants, or the necessity of extended reaction times. For instance, some processes include the use of operating temperatures below 0° C., some requiring temperatures below −20° C. In other processes explosive mixtures of higher dinitro and trinitro compounds are formed. Yields are as low as 10–30% and reaction times as long as 24 hours. The production of large quantities of residues contaminates the final product.

Accordingly, it is an object of the present invention to provide an improved process for preparing p-nitroacetophenone which has reduced reaction time and may be carried out at moderate temperatures.

It is another object of this invention to provide an improved process for the preparation of p-nitroacetophenone which utilizes relatively inexpensive reactants in approximately molar amounts to produce high yields of a high purity product.

It is still another object of this invention to provide an improved process for the production of p-nitroacetophenone in which the product may be separated by extraction and in which the extracting solvents may be recovered and used in further processing.

It is yet another object of the present invention to provide a process for the separation from p-nitroacetophenone of o-nitroacetophenone which is used in the dye stuff industry and which is a valuable chemical intermediate.

Other objects will be apparent to those skilled in the art from reading the following description.

The objects of the present invention are accomplished by the nitration of 1-(chloroethyl) benzene in a non-reactive chlorinated, aliphatic solvent to produce a mixture of ortho- and para-nitrochloroethylbenzene. The mixture of nitrochloroethylbenzenes is then refluxed in an aqueous alkaline solution and converted into a mixture of ortho- and para-nitromethyl phenyl carbinols. The nitromethyl phenyl carbinols are then oxidized to a mixture of nitroacetophenones. The p-nitroacetophenone is separated from the o-nitroacetophenone using an organic solvent.

If desired, the 1-(chloroethyl) benzene may be produced by the hydrohalogenation of styrene. The hydrohalogenation step may be carried out using hydrogen chloride gas. However, the step is preferably carried out by adding the styrene to an aqueous solution of a mixture of hydrochloric and sulfuric acids according to Example 10 of U.S. Patent 2,573,695. The hydrochloric acid-sulfuric acid solution is preferred because of its economy.

In the second step of the present process the 1-(chloroethyl) benzene is dissolved in a chlorinated aliphatic solvent and the temperature is raised preferably to between about 20–50° C., desirably between about 25–30° C. A nitrating medium is added during the course of about 3 to 10 hours, preferably 5 to 6 hours, resulting in essentially complete nitration. The nitration results in the formation of a spent acid layer and an organic layer of product. The spent acid layer is removed from the organic layer by decantation.

In the nitration of 1-(chloroethyl) benzene, it has been found that the formation of the nitrate ester of nitromethyl phenyl carbinol may be totally repressed by first dissolving the chloroethyl benzene in a chlorinated aliphatic solvent prior to nitration. Preferably, carbon tetrachloride is used as the chlorinated aliphatic solvent.

The use of mixed nitrating acids, such as nitric and sulfuric acid which are commonly used in nitration processes, resulted in the undesirable formation of large amounts of the nitrate ester of nitromethyl phenyl carbinol. Fuming nitric acid does not cause such ester formation in the presence of a chlorinated solvent below 50° C. Optimum yields of nitromethyl phenyl carbinol may also be obtained by using acetyl nitrate as the nitrating medium. The acetyl nitrate is commonly made by the addition of fuming nitric acid to acetic anhydride. However, because large quantities of acetic anhydride are necessary for the reaction, fuming nitric acid in carbon tetrachloride is preferred in carrying out the present invention.

The organic layer produced in the nitration step contains a mixture of isomers of nitrochloroethyl benzene in carbon tetrachloride. At the start of the next process step the carbon tetrachloride is removed from the product mixture during the hydrolysis procedure. All of the carbon tetrachloride can be removed by an azeotropic distillation with water. As a result of the removal of the carbon tetrachloride, the only organic material remaining after the hydrolysis is the nitromethyl phenyl carbinol with a small percentage of unreacted nitrochloroethylbenzene.

As the next step of the process the nitrochloroethylbenzenes are hydrolyzed to carbinols. The mixture of nitrochloroethylbenzenes is suspended in about 5 to 20% aqueous alkali solution and heated to reflux or to temperatures of preferably about 80 to 110° C. for 5 to 20 hours. The preferred reaction conditions are 100° C. for 8 hours using a 10% aqueous alkaline solution.

The product of the reaction forms as an oil which readily settles from the reaction medium. The residual oil after separation from the aqueous solution by decantation contains predominantly a mixture of orth- and para-isomers of nitromethyl phenyl carbinol.

It is preferred to use an aqueous solution of sodium carbonate for the hydrolysis of nitrochloroethylbenzene to nitromethyl phenyl carbinol. However, other alkaline media may be used, such as aqueous sodium hydroxide, aqueous potassium hydroxide, and the like.

In the final reaction step of the process, the mixture of ortho- and para-isomers of nitromethyl phenyl carbinol is suspended in an acidified oxidizing solution for 1 to 6 hours at 25 to 80° C. Best results are obtained by heating the suspension to 60° C. for 3 hours.

It is preferred to use a sulfuric acid solution of sodium or potassium dichromate for oxidation of the nitro phenyl carbinols to the nitroacetophenones. Other oxidizing agents, such as potassium permanganate, manganese dioxide, hypochlorite, air, oxygen, and the like have been used to convert carbinols to the corresponding ketones. It has been found that in dichromate oxidation the amount of oxidizing agent necessary for optimum conversion of the carbinols to the ketones is relatively small compared to such other oxidizing agents, particularly to permanganate The reduced products, chromic salts, are water soluble, and the complicated filtration methods necessary to remove undesirable sludges, such as are usually found in permanganate oxidation procedures, are not required. Another advantage of using the present method of dichromate oxidation is that chromic salts are insoluble in the common organic solvents. Therefore, the complete removal of the desired nitroacetophenones from the aqueous medium may be carried out by simple extraction with common organic solvents, such as benzene, toluene, and the like, in which the nitroacetophenones are completely soluble.

In order to recover a purified product from the mixed product of the oxidation step, cold water is added to the mixture. An organic solvent, such as benzene, is then added to extract all of the organic material. The solvent extract is washed with water, then with dilute sodium carbonate, and then with water again. The benzene is then evaporated leaving a residual oil which is a mixture of ortho- and para-nitroacetophenones. The residual oil is heated with a suitable alcohol, such as isopropyl alcohol, and cooled. Upon cooling the para-nitroacetophenone solidifies and settles from the solution. The ortho-nitroacetophenone remains dissolved. The p-nitroacetophenone is about 95 to 97% pure with a melting point of 78–80° C.

The extraction method yields p-nitroacetophenone without undergoing complex methods of recrystallization. Analysis of the resultant p-nitroacetophenone using infrared technique shows that there is no discernable ortho-isomer present. The ortho-isomer may be recovered by simple evaporation of the alcoholic solution to yield approximately 90 to 95% pure o-nitroacetophenone.

In order to disclose more clearly the nature of the present invention, a specific example of the practice of the invention is hereinafter given. It should be understood, however, that this is done solely by way of example and is intended neither to delineate the scope of the invention nor limit the ambit of the appended claims. The term "percent" or "%" is used to express weight percent throughout the specification.

Example I

In order to prepare 1-(chloroethyl) benzene 1100 grams (g.) of styrene were added to a mixture of 1860 g. of 37% hydrochloric acid, and 503 g. of 96% sulfuric acid. The resulting reaction mixture was heated at 60° C. for 4 hours with constant stirring. The chlorinated hydrocarbon was separated from the acid, and washed with cold water. The intermediate product after separation was 1425 g. of 1-(chloroethyl) benzene containing 4% of unreacted styrene. The boiling point of the 1-(chloroethyl) benzene was found to be 74–75° C. at a pressure of 14 millimeters of mercury (mm.).

The entire intermediate product, 1425 g. of 1-(chloroethyl) benzene, was dissolved in 800 milliliters (ml.) of carbon tetrachloride, and 660 g. of fuming nitric acid having a specific gravity of 1.54 were added. The temperature was maintained between 20–25° C. for a period of 5 to 6 hours. At the end of the reaction period, the spent acid was separated from the organic layer. Based on the amount of starting material used, a yield of 1610 g. of nitrated product was obtained. The nitrogen content of the intermediate product was found to be 6.5% indicating an 85% conversion to nitrochloroethyl benzene based on a theoretical nitrogen content of 7.6%.

The solution of the mixture of isomers of nitrochloroethyl benzene in carbon tetrachloride was suspended in a 10% solution of 1020 g. of sodium carbonate in water. The carbon tetrachloride was stripped from the solution by azeotropic distillation, more than 95% of the carbon tetrachloride being recovered. The sodium carbonate-nitrochloroethyl benzene solution was then heated at reflux temperature for 8 hours. The oil that remained after refluxing was separated from the aqueous mixture and a small sample analyzed. After stripping off a small quantity of methyl phenyl carbinol, the residual oil was found to contain 8.4% nitrogen, indicating at 100% conversion to nitromethyl phenyl carbinol.

The nitromethyl phenyl carbinol was then oxidized. A mixture of 668 g. of sodium dichromate containing 2 moles of water was dissolved in a solution containing 1500 g. of concentrated sulfuric acid in 4.2 liters of water. The solution was then heated to 60° C., and 995 g. of the mixture of isomers of nitromethyl phenyl carbinol were added during a period of about 30 minutes with constant stirring. The temperature rose initially to 80° C. then fell to 60° C. After 3 hours reaction time, cold water was added, and the mixture was allowed to cool to 40–50° C. Approximately 700 ml. of benzene were added to extract all of the organi material. The benzene extract was then washed with cold water, dilute sodium carbonate, and finally with water again. The benzene was carefully distilled until a heavy oil remained. A minimum amount of hot isopropyl alcohol was added to effect complete solution of the hot residual oil. The alcoholic solution was allowed to cool. The p-nitroacetophenone product precipitated from the cooled solution. The product was analyzed and found to contain 453 g. of p-nitroacetophenone having a melting point of 78–80° C. equivalent to a yield of 46%. The liquid contained o-nitroceptophenone.

Example II

Three hundred thirty grams (330 g.) of 1-(chloroethyl) benzene were dissolved in 200 ml. of carbon tetrachloride. To the solution were added 150 g. of fuming nitric acid having a specific gravity of 1.54, and the resulting solution was heated at 50° C. for a period of three hours. At the end of this time the spent acid was separated from the organic layer which had formed, and a small sample of the organic layer was carefully distilled to remove the carbon tetrachloride. The nitrogen content of the residual oil of the sample was found to be 6.5%; the theoretical nitrogen content was 7.6%.

The solution of the mixture of isomers of nitrochloroethyl benzene in carbon tetrachloride was suspended in a solution containing 225 g. of sodium carbonate dissolved in 1.56 liters of water. The carbon tetrachloride was stripped from the solution by an azeotropic distillation, and the balance of the mixture was heated at reflux temperature for six hours. The oil that remained after refluxing was separated from the aqueous mixture and found to weigh 331 g. of which 91 g. were methyl phenyl carbinol. The remainder was nitromethyl phenyl carbinol which was found to contain 8.4% nitrogen indicating a 100% conversion and a yield of 62% based on the original quantity of 1-(chloroethyl) benzene used.

A mixture of 77 g. of sodium dichromate containing 2 moles of water was added to a solution of 182 g. of concentrated sulphuric acid in 500 ml. of water. The solution was heated to 60° C., and 120 g. of the mixture of isomers of nitromethyl phenyl carbinol were added during a period of about 30 minutes with constant stirring. The temperature of the solution rose initially to 80° C. and then fell to 60° C. After three hours reaction time cold water was added, and the mixture was allowed to cool to 40–50° C. Approximately 100 ml. of warm benzene were added to extract all of the organic material. The benzene extract was then washed with cold water, dilute sodium carbonate and finally with water again. The remaining benzene extract was carefully distilled until a heavy oil remained. One hundred milliliters (100 ml.) of hot isopropyl alcohol were added to effect complete solution of the residual oil. The alcohol solution was allowed to cool, and para-nitroacetophene precipitated from the cooled solution. The product was analyzed and found to contain 55 g. of para-nitroacetophenone having a melting point of 78–80° C., equivalent to a yield of 46.5%. The alcoholic extract was evaporated, and the residual oil was found by analysis to be ortho-nitroacetophenone.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. In a process for preparing ortho- and para-nitromethyl phenyl carbinols, the improvement comprising:
   (a) adding a nitrating agent selected from the class consisting of fuming nitric acid and acetyl nitrate to a solution of 1-(chloroethyl) benzene in carbon tetrachloride and maintaining the reaction mixture at a temperature of about 20–50° C. for about 3 to 10 hours whereby a mixture of ortho- and para-nitro-1-(chloroethyl) benzenes is produced as an organic layer; and
   (b) contacting said organic layer with an about 5 to 20 percent aqueous alkali solution for about 5 to 20 hours whereby a mixture of ortho- and para-nitromethyl phenyl carbinols is produced.

2. A process according to claim 1 wherein said nitrating agent is fuming nitric acid.

3. A process according to claim 1 wherein said aqueous alkali solution is selected from the class consisting of aqueous solutions of sodium carbonate, sodium hydroxide and potassium hydroxide.

References Cited by the Examiner
UNITED STATES PATENTS

| | | | |
|---|---|---|---|
| 2,449,877 | 9/1948 | Carswell et al. | 260—592 |
| 2,734,073 | 2/1956 | Frevel et al. | 260—592 |
| 2,794,809 | 6/1957 | Troutman | 260—592 |

OTHER REFERENCES

Ford-Moore et al.: "J. Chem. Soc. (London)," 1946, pp. 679–81.

Vesely: "Chem. Listy (Prague, Czech.), volume 47, pp. 746–8, (1953), (abstracted in Chem. Abstracts, vol. 49, p. 226 (1955)).

LEON ZITVER, *Primary Examiner.*

LORRAINE WEINBERGER, *Examiner.*

D. D. HORWITZ, *Assistant Examiner.*